United States Patent Office 3,140,989
Patented July 14, 1964

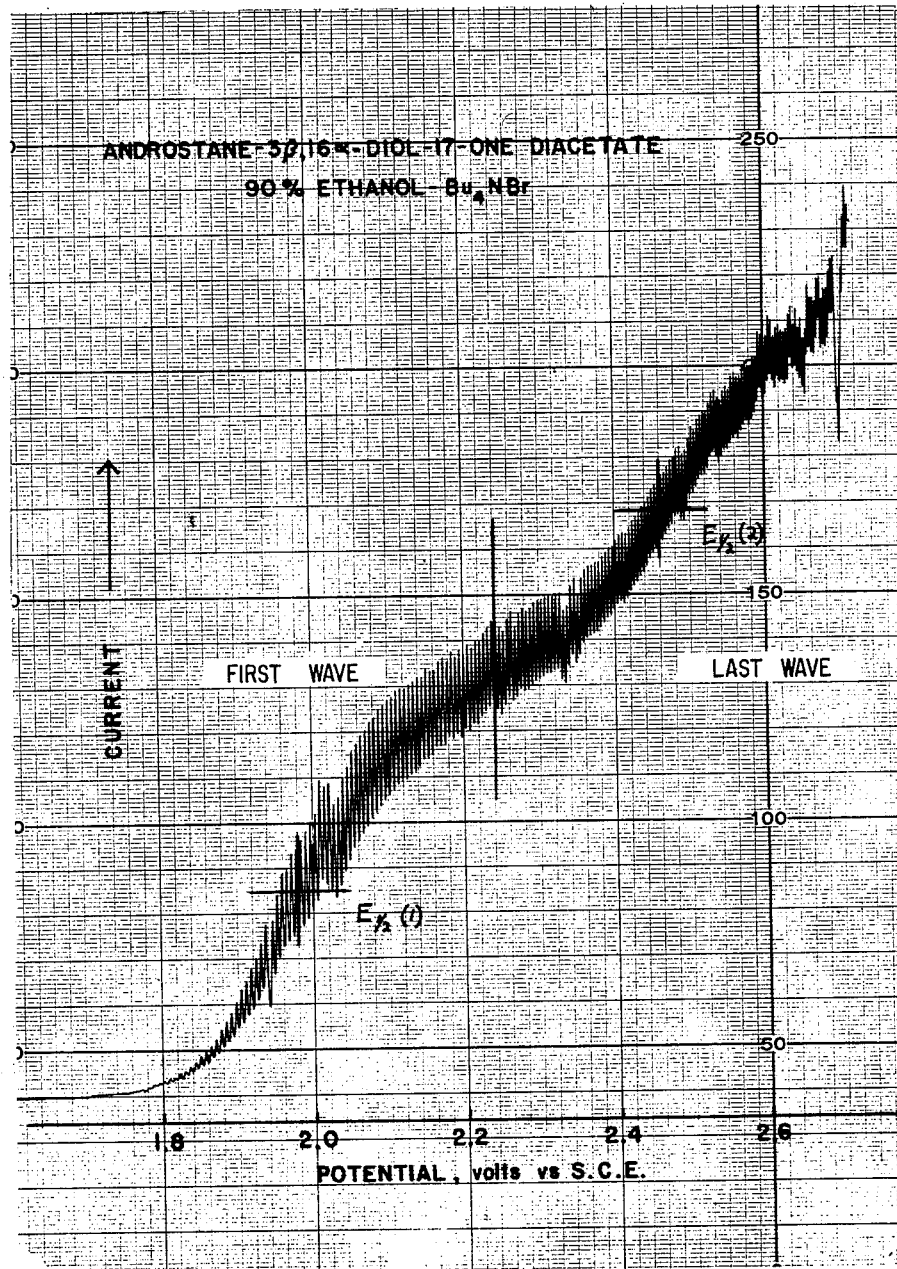

3,140,989
NOVEL ELECTRO-CHEMICAL REDUCTION PROCESS
Peter Kabasakalian, Bloomfield, and James H. McGlotten, East Orange, N.J., assignors to Schering Corporation, Bloomfield, N.J., a corporation of New Jersey
Filed May 27, 1960, Ser. No. 32,100
13 Claims. (Cl. 204—75)

This invention relates to a novel reduction process. More specifically, this process relates to the electrochemical reduction of steroidal ketones and alcohols. In particular, this invention relates to the controlled electrochemical reduction of non-conjugated steroidal ketones, including saturated ketones and α-hydroxy ketone and α-acyloxy ketone derivatives.

By our novel process, a steroidal ketone may be electrochemically reduced to the corresponding alcohol. Thus, for example, androstane-3α-ol-17-one is reduced to androstane-3α,17β-diol and 5-pregnene-3β-ol-20-one is reduced to 5-pregnene-3β,20-diol. In addition, by the proper choice of cathode potential, our electrochemical process provides a method of reducing hydroxyl groups which are positioned alpha to a ketone group in a steroid compound, with or without reduction of the ketone group. In those steroidal α-hydroxy ketones which possess hydroxy groups or acyloxy groups on *both* carbons adjacent to the ketone group, reduction according to our process effects reductive cleavage of both hydroxyl groups, with or without reduction of the ketone. Depending on the choice of cathode potential used in our controlled process, therefore, 5-pregnene-3β,21-diol-20-one may be reduced either to 5-pregnene-3β-ol-20-one or 5-pregnene-3β,20-diol and, 5-pregnene-3β,17α,21-triol-20-one 3,21-diacetate may be reduced to give either 5-pregnene-3β,20-diol or 5-pregnene-3β-ol-20-one.

The steroidal ketones utilized as starting compounds in the novel electrochemical process claimed herein are non-conjugated ketones. By a "non-conjugated steroidal ketone" is meant a saturated ketone derivative as well as an unsaturated ketone derivative wherein a double bond does not stand in conjugated relationship with the ketone double bond and includes their α-hydroxy and α-acyloxy derivatives. Thus, under this definition, androstane-17β-ol-3-one, cholestane-3β,5α-diol-6-one, 5-pregnene-3β-ol-20-one and 5-pregnene-3β,17α,21-triol-20-one triacetate are non-conjugated steroids since none possesses a double bond conjugated with either the 20 or 3-ketone groups. The ketone substituent in a steroidal starting compound may stem from a nuclear carbon, such as at C-17 in androsterone (androstene-3α-ol-17-one) or the ketone group may be part of a side chain such as at C-20 in the compound 5-pregnene-3β-ol-20-one.

Ketones suitable as starting compounds for our process are nuclearly substituted ketones such as androstane-3-one-17β-ol and the 5β-epimer thereof, pregnane-3α,20-diol-12-one, 1,3,5(10)-estratriene-3β-ol-17-one and 22α,5-allospirostane-3β,12β-diol-11-one; and side chain substituted ketones such as 5-pregnene-3β-ol-20-one. Some steroidal α-hydroxy ketones and esters thereof which may be electrochemically reduced are typified by side chain derivatives such as 5-pregnene-3β,21-diol-20-one and the 21-methanesulfonate ester thereof, 5-pregnene-3β,17α-diol-20-one, 5-pregnene-3β,17α,21-triol-20-one and the 3,21-diacetate and 3,17α,21-triacetate thereof, as well as 17-isopregnane-3β,17β-diol-20-one diacetate. Nuclearly substituted α-ketols and esters thereof which are useful starting compounds are such as androstane-3β,16α-diol-17-one diacetate, cholestane-3β,5α-diol-6-one and 22α,5-allospirostane-3β,12β-diol-11-one diacetate.

Our electrochemical reduction process consists essentially of reducing a steroidal non-conjugated ketone (including α-hydroxy ketones and α-acyloxy ketones) in an electrolytic cell having as an electrolyte a salt possessing a difficultly reducible cation (preferably a tetraalkyl substituted ammonium salt such as, for example, tetrabutyl ammonium chloride, and preferably having a mercury or mercury amalgam cathode, said reduction being run at a cathode potential at least as great as the lowest potential on the rising portion of the current-voltage curve of said non-conjugated steroid ketone as obtained, for example, by known polarographic techniques under conditions similar to those to be used for the reduction and, if desired, isolating the reduced steroidal hydroxy or methylene ketone compound thereby formed.

Although electrochemical reductions of conjugated ketones have been run, prior to our invention it was not known to electrochemically reduce saturated and non-conjugated steroidal ketones. Moreover, the controlled electrochemical reduction of α-hydroxy ketones (non-steroidal as well as steroidal) and the acylate esters thereof to produce the corresponding α-hydrogen ketone or α-hydrogen hydroxy was unknown. Our process therefore provides a method of electrochemically reducing those steroidal ketones which are less active due to the absence of a conjugated double bond and which have heretofore never been electrochemically reduced.

Our novel reduction process preferentially utilizes an electrolytic cell containing a mercury or mercury amalgam cathode and an electrolyte comprising a substituted ammonium salt such as tetrabutylammonium chloride. Although mercury or mercury amalgams are preferred, the cathodes can be made of any conducting material possessing a high hydrogen over-voltage. Metals having these properties and which, therefore, may also be used as cathodes are such as cadmium, zinc, lead, nickel and aluminum.

Anode materials which may be used when carrying out our novel process are any difficultly oxidizable conductor such as carbon, nickel, iron and platinum.

Salts which are useful as electrolytes are those possessing a difficultly reducible cation, and include salts such as the halides of the alkaline earth metals, calcium, strontium and barium and of the alkali metals, lithium, sodium, potassium, rubidium, and the like. However, as stated heretofore, the preferred electrolytes are substituted ammonium salts (preferably tetraalkyl substituted) such as tetraethylammonium bromide, tetrabutylammonium hydroxide, triethylmonobutylammonium chloride, tetraethylammonium perchlorate, and the like. The halide salts of difficultly reducible cations are preferred as electrolytes although the sulfate and phosphate salts may also be used.

In addition to being difficultly reducible under the conditions of electrolysis, an electrolyte salt should be sufficiently soluble in the solvent system in the electrolytic cell to give reasonably good conductance. If sufficient conductance is unobtainable in a given solvent with one electrolyte, a mixture of salts may be used such as the mixture utilizing tetraethylammonium bromide and tetrabutylammonium bromide in dimethylformamide.

Solvents which are preferentially used in our electrochemical reduction process are aqueous-alkanol mixtures such as 80% ethanol and anhydrous dimethylformamide, the latter being preferred for the reduction of α-hydroxy and α-acyloxy ketones wherein it is desired to reductively cleave the hydroxyl group without reduction of the ketone. As a rule, any solvent may be used which does not reduce electrolytically before the steroid to be reduced, which has a dielectric constant of at least around 20, and in which the desired electrolyte is reasonably soluble. Solvents which may be utilized are alkanols such as ethanol, propanol and the like; glycols such as ethylene glycol and diethylene glycol; glycol ethers such as Cellosolve; nitriles such as acetonitrile; N-substituted amides such as dimethylformamide, diethylacetamide and the like; benzene-methanol mixtures and the like.

According to our process, a non-conjugated steroidal ketone may be electrochemically reduced at a negative potential at least as great as the lowest potential on the rising portion of the current-voltage (C–V) curve of the non-conjugated steroidal ketone, said C–V curve being obtained under conditions similar to those to be used in the reduction. It is thus preferable to determine the current-voltage curve for a compound prior to electrochemically reducing a steroidal ketone according to the novel process described herein. The C–V curve of a compound may be obtained in a variety of ways such as by utilizing a recording polarograph, or by connecting a recording potentiometer across the electrolysis cell circuit and measuring the C–V curve under the conditions of the reduction run.

The current-voltage reduction curve is known to be constant for a given compound under set conditions and, in fact, can be used as an analytical tool for identification purposes. It is also known that the C–V reduction curve may vary somewhat with the pH, solvent and electrolyte used. It is therefore preferable for carrying out our process to determine the C–V curve of each steroid under conditions essentially identical to those actually to be used during the reduction itself. Thus, if androstane-17β-ol-3-one is to be reduced in an ethanolic solution utilizing an electrolytic cell having a mercury cathode, a nickel anode, and as electrolyte a mixture of tetrabutylammonium bromide and tetrabutylammonium hydroxide, it is desirable to have the current-voltage curve determined polarographically, for example, on an ethanolic solution of androstane-17β-ol-3-one utilizing tetrabutylammonium bromide and tetrabutylammonium hydroxide as electrolytes. When a polarogram or C–V curve for a given compound is known, one can then electrochemically reduce said compound at any potential on the rising portion of the current-voltage curve utilizing a solvent, electrolyte, etc., identical to that employed when determining the polarogram (C–V curve).

A specific C–V reduction curve for a compound is, in part, a measure of the lowest potential at which a compound such as a non-conjugated steroid will become reduced at the cathode, which property varies with each compound. The C–V reduction curves for compounds such as the steroidal non-conjugated ketones consist of three distinct sections and are S-shaped similar to a titration curve of a strong acid and base. The first portion (i.e. pre-reduction portion) consists of an essentially flat plateau having a constant small current value since, without reduction of the steroidal ketone taking place, there is no increase in the current flowing through the cell. The second (i.e. the reduction or rising) portion of the curve begins at the lowest potential at which ketone reduction begins and is evidenced by an almost vertical rise of current concurrent with a small increase in cathode potential. The third portion of the reduction C–V curve (the diffusion plateau) is a second plateau essentially maintaining a maximum current value with increasing cathode potential. The cathode voltage at the mid-point of the rising portion of the C–V curve is defined as the "half-wave potential."

Those ketones possessing an α-hydroxy or α-acyloxy group will have a break or plateau in the rising portion of the C–V curve at the point wherein the α-hydroxyl or α-acyloxy functions are completely reduced and prior to the reduction of the ketone function. The "break" in the curve varies in size and is sometimes very small and may be no more than a slight inflection. In C–V curves such as these, the portion of the rising curve prior to the break is termed the "first wave" and represents the hydroxyl reductive cleavage and the second portion is defined as the "last wave" and represents the reduction of the ketone group.

We have discovered that α-hydroxy and α-acyloxy ketones in dimethylformamide generally possess C–V curves having a distinct plateau after reduction of the hydroxyl group and prior to reduction of the ketone, whereas in a solvent such as 80% ethanol, for example, the break in the curve for the same compound may be but a slight inflection. Dimethylformamide is therefore preferred when reduction of the hydroxyl group is desired without reduction of the ketone function since the larger increment between the maximum potential of the first wave (hydroxy reduction) and the minimum potential of the last wave (ketone reduction) makes it possible to obtain complete reduction of the hydroxy group without contamination of any ketone reduction product.

When reducing a ketone by our novel process, it is advantageous not to use a potential much greater than the maximum potential on the rising portion of the C–V curve. If a much higher potential is used, competing reactions may take place such as reduction of the solvent or electrolyte. If it is desired to reduce a ketone function to a hydroxy group in a non-conjugated steroidal ketone, or an α-hydroxy or α-acyloxy derivative thereof, the reduction potential usually used in our process is in the range from the half-wave potential to about 0.3 to 0.4 volt more negative than the half-wave potential of the ketone C–V curve or of the last wave of the C–V curve of the α-hydroxy or α-acyloxy ketone derivative. Since the last wave of the latter type C–V curve represents the reduction of the ketone function in an α-ketol derivative, it can be said that when reducing a ketone to a hydroxyl group by our process, it is preferred to use a potential in the range of the half-wave potential to about 0.3 to 0.4 volt more negative than the half-wave potential of the rising portion of the ketone reducing wave of a C–V curve.

The attached drawing of the C–V curve for androstane-3β,16α-diol-17-one diacetate (the subject of Example IIC) is typical for an α-hydroxy ketone or ester thereof. For the first wave (i.e., the hydroxy-cleavage wave) the half-wave potential, $E_{1/2}(1)$ is at −1.98 with a low and high potential at about −1.8 and −2.2 volts, respectively; whereas, for the last wave (i.e., the ketone reduction wave) the half-wave potential $E_{1/2}(2)$ is at −2.45 with the low and high potentials at about −2.3 and −2.7, respectively, as described in Example IIC, first paragraph.

When reducing an α-hydroxy or an α-acyloxy group in a steroidal α-hydroxy or α-acyloxy ketone without reduction of the ketone by our process, any potential may be used which is greater than the lowest and less than the highest potential on the first wave of the C–V curve. It is preferable, however, to use a potential approximately equal to the half-wave potential of the first wave of said C–V curve, since at potentials approaching the maximum of the first wave, some ketone reduction may take place.

We have discovered for example that in a 90% ethanol solution utilizing tetrabutylammonium bromide as electrolyte the C–V reduction curve of the α-acyloxy ketol derivative, 1,3,5(10)-estratriene-3,16β-diol-17-one diacetate indicates that the low and high cathode voltage points of the first reduction wave are −1.8 and −2.1 volts, respectively, as referred to a saturated calomel electrode; whereas the low and high cathode voltage points of the last reduction wave are −2.3 and −2.6 volts, respectively. According to our process, therefore, if it is desired to reduce 1,3,5(10)-estratriene-3,16β-diol-17-one diacetate to 1,3,5(10)-estratriene-3,17-diol (i.e. reduction cleavage of the acetoxy with reduction of the ketone function) in a 90% ethanol solution utilizing tetrabutylammonium bromide as electrolyte, the cathode voltage should be at least about −2.3 volts and preferably at, and not much greater than, −2.6 volts. If, on the other hand, it is desired to reduce under similar conditions, 1,3,5(10)-estratriene-3,16β-diol-17-one diacetate to 1,3,5(10)-estratriene-3-ol- 17-one (i.e. reductive cleavage of the acetoxy *without* reduction of the ketone function), the cathode potential should be at least −1.8 volts, not more than −2.1 volts, and preferably −1.9 volts (the half-wave potential).

A typical C–V reduction curve of a simple non-conjugated nuclear steroidal ketone is that of androstane-17β-ol-3-one wherein with tetrabutylammonium chloride as electrolyte and 80% ethanol as solvent, the minimum and maximum cathode potentials on the rising portion of the curve are −2.2 and −2.6, respectively. Thus, the reduction of the aforementioned ketone to the corresponding 3-hydroxyl derivative may be run at any potential higher than the lower limit, although preferentially it is run at a cathode potential in the order of the maximum rising potential since the reductions are completed in less time at these potentials, yet interfering reductions do not take place, as would be the case at still higher potentials.

Illustrative of the effect of solvents on the cathode potential at which reduction will take place, we have found that when utilizing a cell having a mercury cathode and tetrabutylammonium bromide as electrolyte the choice of 90% ethanol as solvent places the limit potentials of the first wave of the C–V reduction curve for 22α,5-allospirostane-3β,12α-diol-11-one diacetate at −2.0 and −2.2 volts and for the last wave at −2.3 and −2.7 volts; whereas the choice of dimethylformamide as solvent places the limit cathode potentials of the first wave of the C–V curve for the same acetoxy ketol at −2.4 and −2.7 volts, respectively. Therefore, an electrochemical reduction of 22α,5-allospirostane-3β,12α-diol-11-one diacetate run in a cell having a mercury cathode and tetrabutylammonium bromide as electrolyte with dimethylformamide as solvent will yield 22α,5-allospirostane-3β-ol-11-one at a cathode patential of −2.5 volts. On the other hand, if 90% ethanol is the solvent used, the electrochemical reductive product at −1.5 volts will be 22α,5-allospirostane-3β,11α-diol.

It has been found that steroidal α-acyloxy ketones reduce faster and at a lower cathode potential than do the corresponding α-hydroxy ketones. Acyloxy radicals which may be used in our electrochemical reduction process include those from alkanoic and aryl carboxylic acids such as acetic and benzoic, respectively, those from inorganic acids such as sulfuric and phosphoric, as well as those from alkyl and aryl sulfonic acids such as methanesulfonic and p-toluenesulfonic acid, respectively. Lower alkanoic acid esters are particularly useful in our reduction process but, when available, the esters of choice for reducing steroidal α-acyloxy ketones according to our invention are the sulfonic acid esters since they reduce at a faster rate and at lower potentials under a given set of conditions, than do other esters. For example, to reduce the 21-acetate of 5-pregnane-3β,21-diol-20-one to 5-pregnene-3β-ol-20-one in 90% ethanol with tetrabutylammonium chloride as electrolyte, a mercury cathode potential of at least −2.1 volts is required, whereas the corresponding 21-methanesulfonate will undergo a similar reduction at a cathode potential as low as −1.5 volts.

Any ketone functions present in a steroidal compound other than the ketone function to be reduced must be protected by forming derivatives such as ketals, acetonides, and the like. When it is desired to reduce the 11-ketone group in cortisone without reduction of the 3- and 20-ketone, the bis-ethylene ketal derivative is prepared according to known procedures utilizing ethylene glycol, and the resulting 3,20-bis-ethylenedioxy-5-pregnene-17α,21-diol-11-one may be reduced at −2.6 volts in ethanol solvent utilizing tetrabutylammonium chloride as electrolyte to give 3,20-bis-ethylenedioxy-5-pregnene-11α,17α,21-triol. Upon hydrolysis of the 3,20-bis-ethylene ketal according to known procedures such as that utilizing dilute aqueous acetic acid, the 11α-epimer of hydrocortisone is produced. It is to be noted that, upon protection of the 20-ketone function, the α-hydroxy groups at C-17 and C-21 do not reduce since these hydroxyl groups were not alpha to a *free* ketone derivative.

Under the electrolysis condition of our novel reduction process, unactivated esters (i.e. those esters not alpha to the ketone) present in the molecule are hydrolyzed to the free alcohol. For example, when 22α,5-allospirostane-3β-ol-12-one 3-acetate is electrochemically reduced, 22α,5-allospirostane-3β,12β-diol is formed.

It is evident from the foregoing that there are countless variations of electrolytic cells which may be used when electrolytically reducing a steroid ketone according to our inventive process. Cells which are particularly useful for ketonic reductions are those wherein the anode and anolyte are separated from the cathode and catholyte by porous alundum cup and which have a mercury cathode, a nickel anode and an electrolyte consisting of tetrabutylammonium salts in 80–90% ethanol solvent. Thus, for example, the reduction of a steroidal ketone such as 5-pregnene-3β,21-diol-one may be effected by adding a solution of the steroidal ketone in 80% aqueous ethanol to the catholyte of an electrolytic cell such as above described, and electrochemically reducing the solution at a cathode potential of −2.6 volts maintained by means of an automatic potentiostat, this voltage being from 0.1 to 0.4 volt more negative than the half-wave potential of 5-pregnene-3β,21-diol-20-one as obtained by known polarographic techniques. When the reduction is completed, as evidenced by the drop in current to a constant value, the reductive electrolysis is stopped and the reduced product, which in this case is 5-pregnene-3β,20-diol, is isolated as described in the experimental section.

By utilizing an electrolytic cell similar to that described above, steroidal non-conjugated mono-nuclear ketones are reduced to the corresponding hydroxyl compounds, and α-hydroxy ketones and α-acyloxy ketones are reduced to the corresponding methylene carbinols (i.e. reductive cleavage of the hydroxyl or acyloxy function with reduction of the ketone to hydroxyl).

When electrochemically reducing a steroidal non-conjugated α-hydroxy or α-acyloxy ketone with reductive cleavage of the hydroxyl group without reducing the ketone function, the same type cell as described hereinabove may be used although dimethylformamide is more advantageously used as solvent and tetraethylammonium bromide as electrolyte.

By the proper choice of electrolyte and solvent, non-conjugated ketones including the α-hydroxy and α-acyloxy derivatives thereof are reduced by our process in excellent yields—usually in the range of 90–100%. In addition, the reduction products are easily isolated in a pure state.

Our electrochemical reduction process advantageously provides an alternate route of obtaining valuable intermediates from other easily obtainable steroidal compounds. For example, 22α,5-allospirostane-3β,12β-diol-11-one diacetate, conveniently derived from the 11α-bromo derivative of hecogenin via the known Marker-Lawson reaction, upon electrochemical reduction according to our novel process yields 22α,5-allospirostane-3β-ol-11-one which is a known, useful intermediate in the preparation of therapeutically valuable corticoids such as cortisone and prednisone.

Other known methods of preparing this 11-keto-12-desoxy intermediate from hecogenin have several steps and involve complicated chemical reactions with a small overall yield. By utilizing our novel process, on the other hand, the aforementioned 11-keto-12-desoxy intermediate is easily obtainable in three steps, of which the yield in our electrochemical reduction step is close to theoretical.

Similarly, via our controlled electrochemical reduction process, 11α-hydroxydiosgenin, another known valuable intermediate in the synthesis of cortisone and prednisone is conveniently obtainable from 11-keto-12-hydroxy (or acetoxy)-diosgenin, the latter intermediate being conveniently prepared from botogenin via known techniques.

The following examples are illustrative of our inven-

EXAMPLE I

*Reduction of steroidal α-unsubstituted non-conjugated ketones to the corresponding alcohol*

A. DETERMINATION OF CURRENT-VOLTAGE CURVES AND GENERAL ELECTROLYSIS PROCEDURE

The current-voltage curves of non-conjugated steroidal ketones to be reduced are obtained on 5 ml. portions of approximately one millimolar solutions of steroidal ketone utilizing a Sargent Model XXI recording polarograph.

The solutions to be polarographed are prepared by dissolving in a 10 ml. volumetric flask 0.00001 mole (approximately 3 mg.) of steroidal ketone, 0.5 ml. of one molar aqueous tetrabutylammonium chloride and 0.5 ml. of water in enough 95% ethanol to a make a total solution volume of ten milliliters.

The current-voltage curves for the starting steroidal ketones in Examples IB-1 through IB-6 and in Example IC are all similar. The C-V curve of 22α,5-allospirostane-3β-ol-12-one acetate is typical, having a low cathode potential of —2.3 volts and a high cathode potential of —2.7 on the rising portion of the curve, thus giving a half-wave potential of —2.51 volts.

The electrolysis cell consists of a circular glass cathode compartment with a 1 cm. deep pool of mercury acting as the cathode. Contact with the mercury is made through a side arm attached to the cell at a point below the mercury level. The anode compartmnet is an Alundum cup suspended in the cathode compartment with a nickel wire screen serving as the anode metal. The electrolysis is carried out using an automatic potentiostat such as the Lingane-Jones type (J. J. Lingane et al., Anal. Chem. 22, 1169 (1950)), the electrolytic reduction being carried out until the current measurement decreases to a constant value.

The anolyte solution is prepared by combining 40 ml. of 95% ethanol, 5 ml. of one molar tetrabutylammonium chloride and 5 ml. of one molar tetrabutylammonium hydroxide. The solution is added to a porous Alundum cup and allowed to stand in air until the cup becomes damp on the outside. The catholyte solution, prepared by adding 19 g. of tetrabutylammonium bromide to 200 ml. of 95% ethanol and 60 ml. of water, is added to the electrolysis cell containing the mercury. Nitrogen is bubbled through the catholyte solution for 30 minutes after which the Alundum cup with its nickel anode and containing the anolyte, is suspended in the cathode compartment so that the bottom of the cup is near, but not touching, the mercury. A standard saturated calomel electrode is inserted in the cathode compartment so that the tip just touches the mercury surface. The catholyte solution is stirred and the control potential between the mercury and calomel electrodes is set at —2.6 volts (SCE) by adjusting the potentiostat. The catholyte solution is electrolyzed at —2.6 volts until the current decreases to a constant value. One gram of steroidal ketone dissolved in 40 ml. of 95% alcohol is then added to the catholyte solution and the electrolysis continued until the current returns to the constant value possessed by the catholyte prior to the addition of the steroid. The electrolysis is usually completed in from 50 to 80 minutes.

The catholyte reaction solution is then siphoned from the mercury cathode. The cathode is washed three times with 95% ethanol, and the washings combined with the original solution. The solution is filtered through Celite to remove colloidal mercury and is then acidified with acetic acid and diluted with water. The solution is evaporated in vacuo at room temperature to a volume of about 100 ml. The resultant aqueous suspension is cooled and filtered, and the solid precipitate washed thoroughly with water and dried in vacuo to a constant weight to give the reduced steroidal ketone product. Infrared spectrum of each reduction product is determined as a Nujol mull.

B. REDUCTION OF NUCLEAR KETONES (1) *Androstane-3β,17β-diol.*—One gram of androstane-17β-ol-3-one is electrochemically reduced at a cathode potential of —2.6 volts in the manner of Example IA and the resultant product isolated as described to give essentially a theoretical yield of androstane-3β,17β-diol, M.P. 154–155° C., $[\alpha]_D^{25}$ +11.6 (EtOH); and an infrared spectrum showing a lack of carbonyl bond. When recrystallized from acetone-isopropyl ether the androstane-3β,17β-diol of this example melts at 166–167° C.

(2) *5β-androstane-3α,17β-diol.*—5β - androstane - 17β-ol-3-one is electrochemically reduced at a cathode potential of —2.6 volts in the manner of Example IA. The resultant product is isolated as described to give a 95% yield of 5β-androstane-3α,17β-diol, M.P. 229–233° C. (recrystallized from acetone-isopropyl ether, M.P. 234–236° C.); $[\alpha]_D$25 +25.1° ($C_2H_5OH$), having an infrared spectrum showing a lack of carbonyl bond.

(3) *3,20 - bis-ethylenedioxy - 5 - pregnene-11α,17α,21-triol.*—3,20 - bis-ethylenedioxy - 5 - pregnene-17α,21-diol-11-one is electrochemically reduced at a cathode potential of —2.6 volts in the manner of Example IA. The resultant product is isolated as described to give a 90% yield of 3,20-bis-ethylenedioxy-5-pregnene - 11α,17α,21-triol, M.P. 283–285° C. (recrystallized from ethyl acetate-ethanol, M.P. 288–292° C.), $[\alpha]_D^{25}$ —33.5° (pyridine), having an infrared spectrum showing a lack of carbonyl bond.

(4) *Pregnane-3,α12β,20β-triol.*—Pregnane-3α,20β-diol-12-one is electrochemically reduced at a cathode potential of —2.6 volts in the manner of Example IA. The resultant product is isolated as described to give an 89% yield of pregnane-3α,12β,20β-triol, M.P. 227–229° C. (recrystallized from ethyl acetate, M.P. 228–230° C.), $[\alpha]_D^{25}$ +29.0° (dimethylformamide). An infrared spectrum of the product of this example shows an absence of carbonyl bond.

(5) *1,3,5(10)-estratriene-3,17β-diol (β-Estradiol).*—1,3,5(10)-estratriene-3-ol-17-one is electrochemically reduced at —2.6 volts in the manner of Example IA. The resultant product is isolated as described to give a 96% yield of 1,3,5(10)-estratriene-3,17β-diol, M.P. 162–166° C. (recrystallized from aqueous methanol, M.P. 172–175° C.), $[\alpha]_D^{25}$ +79° (ethanol), infrared spectrum lacking carbonyl bond.

(6) *22α,5-allospirostane-3β,12β-diol.*—22α,5-allospirostane-3β-ol-12-one acetate is electrochemically reduced at —2.6 volts in the manner of Example IA. The resultant product is isolated as described to give a 91% yield of 22α,5-allospirostane-3β,12β-diol, M.P. 185–193° C., $[\alpha]_D^{25}$ —70.9° (chloroform). No carbonyl bonds are present in the infrared spectrum of the compound of this example.

C. REDUCTION OF SIDE CHAIN KETONES—5-PREGNENE-3β,20-DIOL 5-pregnene-3β-ol-20-one is electrochemically reduced at —2.6 volts in the manner described in Example IA. The resultant product is isolated as described to give a 92% yield of 5-pregnene-3β,20-diol, M.P. 185–193° C., $[\alpha]_D^{25}$ —70.9° (chloroform) which is a mixture of 5-pregnene-3β,20α-diol and 5-pregnene-3β,20β-diol.

The specific rotation of 5-pregnene-3β,20β-diol reported by R. B. Turner and C. M. Voitle in J. Am. Chem. Soc. 73, 2283 (1951), is —53.5° in chloroform. A number of polarometric measurements on two different batches of authentic 5-pregnene-3β,20β-diol (obtained by the sodium in propanol reduction of 5-pregnene-3β-ol-20-one) results in an average $[\alpha]_D^{25}$ value of —76.9° (chloroform). Comparison of the specific rotation of the reduction product mixture of this example (—70.9°) with that of authentic 5-pregnene-3α,20α-diol (—53.5°) and 5-pregnene-3α,-

20β-diol (−76.9°) indicates a mixture of 26% alpha and 74% beta C-20-isomers.

The structure of the isomeric mixture of the compound of this example is characterized further through the diacetate esters prepared from the isomeric product mixture with acetic anhydride and pyridine according to known procedures. Polarometric analysis carried out using the specific rotation data of Turner and Voitle for the isomeric mixture of 5-pregnene-3β,20-diacetates reveals the presence of 30% 5-pregnene 3β,20α-diol and 70% 5-pregnene-3β,20β-diol in the product of this example.

EXAMPLE II

*Reduction of steroidal α-hydroxy ketones and steroidal α-acyloxy ketones with cleavage of the hydroxy function with reduction of ketone*

A. 5-PREGNENE-3β,20-DIOLS

Polarograms of ethanol solutions of 5-pregnene-3β,21-diol-20-one, 5-pregnene-3β,17α-diol-20-one, 5-pregnene-3β,17α,21-triol-20-one and the 3,21-diacetate and 3,17α,21-triacetate thereof, are each obtained in the manner described in Example IA. The C–V curves of the aforementioned compounds are all similar and the low and high potentials of the last wave (i.e. the ketone reducing wave) are substantially −2.2 and −2.7 volts respectively, the half-wave potential of the ketone reducing wave being −2.4.

(1) 5-pregnene-3β,21-diol-20-one is electrochemically reduced at −2.6 volts in the manner of Example IA. The resulting product is isolated as described to give a 93% yield of a 5-pregnene-3β,20-diol isomeric mixture, M.P. 180–197° C., $[\alpha]_D^{25}$ −70.2° (chloroform). This mixture is 5-pregnene-3β,20α-diol and 5-pregnene-3β,20β-diol which, as determined from the rotation data of the crude 5-pregnene-3β,20-diols and the diacetates thereof, paper chromatography and infrared spectrum, is identical with the isomeric mixture of 5-pregnene-3β,20-diols obtained from the electrochemical reduction of 5-pregnene-3β-ol-20-one described in Example IC.

Paper chromatography techniques used in these examples are as follows. Papergrams are run in toluene-propylene glycol and ligroin (B.P. 60–90° C.)-propylene glycol. Precut sheets of Whatman No. 1 paper are dipped in 50% propylene glycol-methanol and blotted to dryness. The solvent is allowed to descend 45 cm. (3–5 hours) or the paper is serrated and run overnight (16 hours). A saturated solution of antimony trichloride in chloroform is used for the detection of Δ⁵, 3β-alcohols and 10% phosphomolybdic acid in methanol for saturated alcohols. Quantitative measurements are made with a Photovolt densitometer, model 525, and areas are measured with an Ott compensating planimeter.

(2) 5-pregnene-3β,17α-diol-20-one is electrochemically reduced in the manner of Example IA. The resulting product is isolated as described to give an 82% yield of an isomeric mixture of 5-pregnene-3β,20-diol, M.P. 175–190° C., $[\alpha]_D^{25}$ −72.3° (chloroform) and having an infrared spectrum with no carbonyl bands consisting principally of 5-pregnene-3β,20β-diol and 5-pregnene-3β,20α-diol and, in addition, some 17-iso-5-pregnene-3β,20β-diol and 17-iso-5-pregnene-3β,20α-diol.

Paper chromatographic analysis (utilizing techniques described in Example IIB-1) of the 5-pregnene-3β,20-diol isomeric mixture of this example shows two spots with the same R_F values corresponding to authentic 5-pregnene-3β,20α-diol and 5-pregnene-3β,20β-diol indicating the reduction of the C-17 hydroxyl group. Under the conditions of the chromatographic technique used, 5-pregnene-3β,17α,20β-triol migrates more slowly than either component of the reduction mixture of this example.

The 5-pregnene-3β,20-diol isomeric mixture obtained in this example is reacted with acetic anhydride and pyridine in the manner of the acetylation procedure described in Example IB to give an isomeric mixture of 5-pregnene-3β,20-diol diacetate whose infrared spectrum indicates the absence of any hydroxyl groups. This further demonstrates that the C-17 hydroxyl group present in the starting compound has been reductively cleaved.

The quantity of 17-iso-5-pregnene-3β,20-diol present is determined as follows. The 5-pregnene-3β,20-diol isomeric mixture of this exampel is catalytically reduced to give an isomeric mixture of pregnane-3β,20-diol, which is, in turn, mixed with a 50% excess of chromic acid in 95% acetic acid and left at room temperature 16 hours, according to known techniques to yield near quantitative yields of a mixture of allopregnane-3,20-dione and iso-allopregnane-3,20-dione. Complete oxidation is evidenced by the infrared spectrum of this oxidized mixture which shows no hydroxyl absorption and paper chromatographic analysis which yields a single spot with the same R_F as authentic allopregnane-3,20-dione. A comparison of the specific rotation data of the oxidation product mixture thus obtained from the isomeric mixture of 5-pregnene-3β,20-diol of this example with that of authentic allopregnane-3,20-dione and 17-iso-allopregnane-3,20-dione indicates the presence of 74% of the normal and 26% of the iso product.

(3, 4, 5) In a manner similar to that described in Example IIA-2, 5-pregnene-3β,17α,21-triol-20-one, 5-pregnene-3β,17α,21-triol-20-one 3,21-diacetate and 5-pregnene-3β,17α,21-triol-20-one triacetate are each electrochemically reduced at −2.6 volts. The resultant products are each isolated and characterized to give 5-pregnene-3β,20-diol as an isomeric mixture substantially of 5-pregnene-3β,20β-diol, 5-pregnene-3β,20α-diol together with some 17-iso-5-pregnene-3β,20β-diol and 17-iso-5-pregnene-3β,20α-diol. The yields, melting points and rotation data for the 5-pregnene-3β,20-diol isomeric products thus obtained are respectively as follows: 94%, M.P. 182–198° C., $[\alpha]_D^{25}$ −64.4°; 96%, M.P. 117–191° C., $[\alpha]_D^{25}$ −69.7°; and 90%, M.P. 176–188° C., $[\alpha]_D^{25}$ −68.0°.

B. ALLOPREGNANE-3β,17-DIOLS

The C–V curve of 17-iso-allopregnane-3β,17β-diol-20-one diacetate in ethanol obtained as described in Example IA reveals that the low and high potential of the ketone-reducing wave are −2.2 and −2.7 respectively, the half-wave potential value being −2.4.

17-iso-allopregnane-3β-17β-diol-20-one diacetate is electrochemically reduced at −2.6 volts in the manner described in Example 1A and the resultant product isolated to give a mixture of allopregnane-3β,20α-diol and allopregnane-3β,20β-diol a small amount of 17-iso-allopregnane-3β,20β-diol and 17-iso-allopregnane-3β-20α-diol. Paper chromatographic analysis according to the technique outlined in Example 11A-1 shows two spots of approximately equal intensity having R_F equal to that of authentic allopregnane-3β,20β-diol and authentic allopregnane-3β,20α-diol, each spot being contaminated with a little C-17-isodiol. Paper chromatographic analysis also shows that no starting material is present.

C. ANDROSTANE-3β,17β-DIOL

A polarogram of androstane-3β,16α-diol-17-one diacetate in 90% ethanol obtained by the procedure described in Example IA gives a C–V curve shown in the attached drawing wherein the low and high cathode potential of the ketone reduction wave is −2.3 and −2.7 respectively, the half-wave potential being −2.45 volts.

Androstane-3β,16α-diol-17-one diacetate is electrochemically reduced in aqueous ethanol at −2.6 volts in the manner of Example IA. The resultant product is isolated in the manner described to give a 95% yield of androstane-3β,17β-diol, M.P. 158–169° C., $[\alpha]_D^{25}$ +10.1° (ethanol), having no carbonyl bands in the infrared spectrum.

D. CHOLESTANE-3β,6α-DIOL

A polarogram of cholestane-3β,5α-diol-6-one in ethanol obtained by the procedure described in Example 1A gives a C–V curve wherein the low and high cathode potential of the ketone reduction wave is −2.2 and −2.7, respectively, the half-wave potential value being −2.45.

Cholestane-3β,5α-diol-6-one is electrochemically reduced in ethanol at −2.6 volts in the manner of Example 1A. The resultant product is isolated in the described manner to give a 93% yield of cholestane-3β,6-diol, M.P. 215–220° C., $[α]_D^{25}$ +30.4° (chloroform) which is a mixture of cholestane-3β,6α-diol and cholestane-3β,6β-diol. The specific rotation data (+30.4°) of the isomeric mixture as compared with the known rotations for cholestane-3β,6α-diol (+38°) and for cholestane-3β,6β-diol (+13°) indicates the presence of 68% of the 6α-isomer.

E. 22α,5-ALLOSPIROSTANE-3β,11α-DIOL

22α,5-allospirostane-3β,12β-diol-11-one diacetate is electrochemically reduced in ethanol at −2.6 volts in the manner described in Example IA. The resultant product is isolated to give a 97% yield of 22α,5-allospirostane-3β,11α-diol, M.P. 217–218° C., $[α]_D^{25}$ −69.5° (chloroform). Paper chromatography of the product of this example shows only a single spot consistent with the form of a single isomer.

EXAMPLE III

*Reduction of steroidal α-hydroxy ketones and steroidal α-acyloxy ketones with cleavage of the hydroxyl function without reduction of the ketone group*

A. GENERAL PROCEDURE

The current-voltage curves of the α-hydroxy and α-acyloxy non-conjugated steroidal ketones to be reduced in this example are obtained as described in Example IA.

The solutions to be polarographed are prepared as described in Example IA except that tetraethylammonium bromide is used as electrolyte instead of tetrabutylammonium chloride and dimethylformamide is used as solvent instead of ethanol.

The electrolysis cell is the same as that described in Example IA with the exception that the anode consists of platinum wire.

The anolyte solution is prepared by adding 2 g. of oxalic acid to 50 ml. of anhydrous dimethylformamide saturated with tetraethylammonium bromide. The solution is added to a porous Alundum cup and allowed to stand in air until the cup becomes damp on the outside. The catholyte solution prepared by saturating 200 ml. of dimethylformamide with tetraethylammonium bromide is added to the electrolysis cell containing the mercury. In a manner similar to that described in Example IA, nitrogen is bubbled through the catholyte solution for 30 minutes after which the Alundum cup with its platinum anode and containing the anolyte is suspended in the cathode compartment. A standard saturated calomel electrode is inserted in the cathode compartment and the control potential between the mercury and calomel electrodes is usually set at from −2.1 to −2.3 volts (SCE). The catholyte solution is electrolyzed at the set voltage (i.e. −2.1 to −2.3) until the current decreases to a constant value. One gram of steroidal α-hydroxy ketone dissolved in anhydrous dimethylformamide is added to the catholyte solution and the electrolysis continued until the current returns to the constant value possessed by the catholyte prior to the addition of steroid. The reduction products are isolated in the manner described in Example IA.

B. ANDROSTANE-3β-OL-17-ONE

The C–V curve of androstane-3β,16α-diol-17-one diacetate in dimethylformamide obtained as described in IIIA has a first wave (hydroxy reduction wave) having a low and high cathode potential of −2.1 and −2.4 volts, respectively, thus having a hydroxy reduction half-wave potential of −2.26 volts; and a final wave (ketone reduction) having a low and high potential of −2.6 and −2.8 volts, respectively, thus giving a ketone reduction half-wave potential of −2.7 volts.

Androstane-3β,16α-diol-17-one diacetate is electrochemically reduced in dimethylformamide at −2.26 volts in the manner described in Example IIIA. The resultant product is isolated as described to give androstane-3β-ol-17-one.

C. 22α,5-ALLOSPIROSTANE-3β-OL-11-ONE

The C–V curve of 22α,5-allospirostane-3β,12β-diol-11-one diacetate obtained as described in Example IIIA in dimethylformamide has a hydroxy reduction wave (first wave) wherein the low and high cathode potentials are −2.3 and −2.8 respectively, having a half-wave potential of −2.6 volts.

22α,5-allospirostane-3β,12β-diol-11-one diacetate is electrochemically reduced in dimethylformamide in the manner of Example IIIA at a cathode potential of −2.4 volts. The resultant product is isolated as described to give 22α,5-allospirostane-3β-ol-11-one.

D. 5-PREGNENE-3β-OL-20-ONE

The C–V curve of 5-pregnene-3β,21-diol-20-one 3-acetate 21-methanesulfonate in dimethylformamide obtained as described in Example IIIA has a hydroxy-reduction wave (first wave) wherein the low and high cathode potentials are −1.6 and −2.0 respectively, giving a hydroxy half-wave potential of −1.7 volts. (When a polarogram of the same mixed di-ester is run in ethanol with tetrabutylammonium chloride as in Example IA, the low and high cathode potentials of the hydroxy reduction curve (first wave) are −1.5 and −1.9 volts, respectively, half-wave is −1.7 volts).

5-pregnene-3β,21-diol-20-one 3-acetate 21-methanesulfonate is electrochemically reduced in dimethylformamide at −2.0 volts in the manner described in Examples IIIA to give 5-pregnene-3β-ol-20-one.

A polarogram of 5-pregnene-3β,21-diol-20-one 21-acetate in dimethylformamide gives a low and high potential of the hydroxy wave as −2.1 and −2.6 volts, respectively, half-wave is −2.4.

Alternatively, the compound of this example is prepared by electrochemically reducing 5-pregnene-3β,21-diol-20-one 21-acetate in dimethylformamide at −2.3 in the manner similar to that described in Example IIIA.

We claim:

1. A process for reducing a hydroxy group positioned alpha to a ketone group in a steroid compound which comprises electrochemically reducing a steroidal hydroxyketone of the group consisting of a steroidal α-hydroxy ketone and esters thereof at a cathode potential of about at least as negative as the lowest potential on the rising portion of the current-voltage curve of said steroidal hydroxyketone with an electrolyte comprising a salt having a difficultly reducible cation of the group consisting of alkaline earth, alkali metal, and substituted ammonium ions.

2. A process for reducing a hydroxy group positioned alpha to a ketone group in a steroid compound without reduction of the ketone group which comprises electrochemically reducing a steroidal hydroxyketone of the group consisting of a steroidal α-hydroxy ketone and esters thereof at a cathode potential in the range of about at least as negative as the lowest potential and less negative than the highest potential on the first wave of the current-voltage curve of said steroidal hydroxyketone with an electrolyte comprising a salt having a difficultly reducible cation of the group consisting of alkaline earth, alkali metal, and substituted ammonium ions.

3. A process according to claim 2 wherein the cathode potential is approximately equal to the half-wave potential on the first wave of the current-voltage curve of said steroidal hydroxyketone.

4. A process for reducing a hydroxy group positioned alpha to a ketone group in a steroid compound with concomitant reduction of the ketone group which comprises electrochemically reducing a steroidal hydroxyketone of the group consisting of a steroidal α-hydroxy ketone and esters thereof at a cathode potential of about at least as negative as the lowest potential on the last wave of the current-voltage curve of said steroidal hydroxyketone with an electrolyte comprising a salt having a difficultly reducible cation of the group consisting of alkaline earth, alkali metal, and substituted ammonium ions.

5. The process according to claim 4 wherein the cathode potential is in the range of the half-wave potential to about 0.3–0.4 volt more negative than the half-wave potential of the last wave of the current-voltage curve of said steroidal hydroxyketone.

6. The process which comprises electrochemically reducing a steroidal ketone of the group consisting of α-hydroxy ketone derivatives and α-acyloxy ketone derivatives of a steroid devoid of a ketone-conjugated double bond in aqueous ethanol solvent at a cathode of the group consisting of mercury and mercury amalgams, said cathode having a potential approximately 0.3 volt more negative than the half-wave potential of the final wave of the current-voltage curve of said steroidal ketone with an electrolyte comprising a salt having a substituted ammonium cation, whereby said α-hydroxy and α-acyloxy groups are reductively cleaved and said ketone group is reduced to a hydroxyl function.

7. The process according to claim 6 wherein said cathode is mercury and said electrolyte is a tetraalkylammonium halide.

8. The process which comprises electrochemically reducing a steroidal ketone of the group consisting of α-hydroxy ketone derivatives and α-acyloxy ketone derivatives of a steroid devoid of a ketone-conjugated double bond at a cathode of the group consisting of mercury and mercury amalgams, said cathode having a potential approximately equal to the half-wave potential of the first wave of the current-voltage curve of said steroidal ketone with an electrolyte comprising a salt having a substituted ammonium cation, in a solvent which reduces at a potential greater than said cathode potential, said solvent having a dielectric constant greater than 20; whereby said α-hydroxy and α-acyloxy functions are reductively cleaved and said ketone function is unchanged.

9. The process according to claim 8 wherein said cathode is mercury and said solvent is dimethylformamide.

10. The process according to claim 9 wherein said electrolyte is a tetraalkylammonium halide.

11. The process of preparing 22α,5-allospirostane-3β,11α-diol which comprises electrochemically reducing 22α,5-allospirostane-3β,12β-diol-11-one diacetate in aqueous ethanol at a mercury cathode having a potential of about −2.6 volts with tetrabutylammonium chloride and tetrabutylammonium hydroxide as electrolytes.

12. The process of preparing 22α,5-allospirostane-3β-ol-11-one which comprises electrochemically reducing 22α,5-allospirostane-3β,12β-diol-11-one diacetate in dimethylformamide at a mercury cathode having a potential of about −2.3 volts and tetraethylammonium bromide as electrolyte.

13. The process of preparing 5-pregnene-3β-ol-20-one which comprises electrochemically reducing 5-pregnene-3β,21-diol-20-one 21-methanesulfonate in dimethylformamide at a mercury cathode having a potential of −2.1 volts with tetraethylammonium bromide as electrolyte.

References Cited in the file of this patent
UNITED STATES PATENTS

| | | |
|---|---|---|
| 2,356,596 | Kramli et al. | Aug. 22, 1944 |
| 2,700,021 | Elofson | Jan. 18, 1955 |
| 2,846,382 | Allen | Aug. 5, 1958 |